United States Patent
Won et al.

(10) Patent No.: US 10,852,453 B2
(45) Date of Patent: Dec. 1, 2020

(54) METHOD FOR PROVIDING AVIATION/MARINE WEATHER FORECAST CHART, AND ELECTRONIC DEVICE FOR PERFORMING SAME

(71) Applicant: IPS INTERNATIONAL PROPERTY LAW FIRM, Seoul (KR)

(72) Inventors: Wan Sik Won, Bucheon-si (KR); Chang Bae Lee, Goyang-si (KR); Yong Phil Joh, Seoul (KR)

(73) Assignee: IPS INTERNATIONAL PROPERTY LAW FIRM, Seoul (KR)

( * ) Notice: Subject to any disclaimer, the term of this patent is extended or adjusted under 35 U.S.C. 154(b) by 0 days.

(21) Appl. No.: 15/753,320

(22) PCT Filed: Aug. 18, 2016

(86) PCT No.: PCT/KR2016/009133
§ 371 (c)(1),
(2) Date: Feb. 18, 2018

(87) PCT Pub. No.: WO2017/030403
PCT Pub. Date: Feb. 23, 2017

(65) Prior Publication Data
US 2018/0239058 A1     Aug. 23, 2018

(30) Foreign Application Priority Data

Aug. 18, 2015   (KR) ........................ 10-2015-0116060

(51) Int. Cl.
*G01W 1/10*     (2006.01)
*G08G 5/00*     (2006.01)
(Continued)

(52) U.S. Cl.
CPC ............... *G01W 1/10* (2013.01); *G01P 13/02* (2013.01); *G01W 1/06* (2013.01); *G08G 5/0013* (2013.01);
(Continued)

(58) Field of Classification Search
None
See application file for complete search history.

(56) References Cited

U.S. PATENT DOCUMENTS 9,349,296 B2 *  5/2016  Wiesemann .......... G08G 5/0013
2006/0155432 A1  7/2006  Brown
(Continued)

FOREIGN PATENT DOCUMENTS

JP        07-012582 A    1/1995
JP      2002-260200 A    9/2002
(Continued)

OTHER PUBLICATIONS

Park, Jin-Hyo et al., "Aviation Weather Service by using the Spatial Information System", Proceedings on Korea Information Processing Society 24th Autumn Conference, vol. 12, No. 2, pp. 541-544, Nov. 2005.

*Primary Examiner* — Peter D Nolan
*Assistant Examiner* — Demetra R Smith-Stewart
(74) *Attorney, Agent, or Firm* — Maschoff Brennan

(57) ABSTRACT

A method for providing an aviation weather chart and an apparatus using the same. An aviation weather chart apparatus according to an aspect of the present invention may compromise: a communication unit which is connected to a weather server and an flight path server so as to acquire aviation weather information from the weather server, acquire flight path information from the flight path server, and acquire flight identification information from a network; and a control unit which acquires the flight path information
(Continued)

corresponding to the flight identification information, acquires the aviation weather information corresponding to the flight path information, and acquires an aviation weather chart such that the flight path information and the weather information are displayed at one time on the basis of a flight information region through which a flight corresponding to the flight information passes and the weather information corresponding to the flight information region.

18 Claims, 14 Drawing Sheets

(51) Int. Cl.
  *G01W 1/06* (2006.01)
  *G01P 13/02* (2006.01)
(52) U.S. Cl.
  CPC ......... *G08G 5/0021* (2013.01); *G08G 5/0047* (2013.01); *G08G 5/0091* (2013.01); *G01W 2203/00* (2013.01)

(56) References Cited

U.S. PATENT DOCUMENTS

| | | | | |
|---|---|---|---|---|
| 2006/0259234 A1* | 11/2006 | Flynn | ...................... | G01C 21/00 701/528 |
| 2011/0022294 A1* | 1/2011 | Apley | ...................... | G01W 1/00 701/532 |
| 2011/0246176 A1* | 10/2011 | Arasada | ................. | G06Q 10/06 704/3 |
| 2012/0209459 A1 | 8/2012 | Klooster | | |
| 2012/0274484 A1* | 11/2012 | Zimmer | ............... | G08G 5/0091 340/945 |
| 2013/0046422 A1* | 2/2013 | Cabos | .................. | G08G 5/0034 701/3 |
| 2015/0332490 A1* | 11/2015 | Coulmeau | ............. | G01C 21/00 701/3 |
| 2015/0339930 A1* | 11/2015 | McCann | ............. | G08G 5/0039 701/528 |
| 2015/0360566 A1* | 12/2015 | Bas Gago | ............... | G01W 1/10 340/971 |
| 2016/0125741 A1* | 5/2016 | Shorter, Jr. | ................ | G06F 3/00 701/528 |
| 2016/0125743 A1* | 5/2016 | Shorter, Jr. | .......... | G08G 5/0034 701/528 |
| 2017/0229021 A1* | 8/2017 | McCann | ............. | G08G 5/0039 |

FOREIGN PATENT DOCUMENTS

| | | |
|---|---|---|
| JP | 2006-321475 A | 11/2006 |
| JP | 2012-166779 A | 9/2012 |

* cited by examiner

FIG. 6

| POINT | LAT | | LONG | AWY | ACTM |
|---|---|---|---|---|---|
| -ZSHA | N37 | 10.2 | E12400.0 | G597 | 00.28 |
| -ZYSH | N38 | 06.5 | E12238.9 | A326 | 00.41 |
| -ZBPE | N38 | 39.5 | E11957.4 | A326 | 01.03 |
| -ZLHW | N40 | 19.1 | E10701.7 | A596 | 02.45 |
| -ZWUQ | N41 | 51.7 | E09512.0 | B215 | 04.10 |
| -UAAA | N43 | 30.0 | E08043.2 | G270 | 05.56 |
| . . . | | | | | |

METHOD FOR PROVIDING AVIATION/MARINE WEATHER FORECAST CHART, AND ELECTRONIC DEVICE FOR PERFORMING SAME

TECHNICAL FIELD

The present invention relates to a method of providing an aviation/marine weather chart and an electronic device performing the same, and more particularly, to a method of providing an aviation/marine weather chart in which aviation/marine weather information required for flight or sailing and an flight path of the flight or path of Ship, and a device using the same.

BACKGROUND ART

Recently, as the number of aircraft accidents increases, there is a growing need for aircraft safety. While aircraft accidents can result from a variety of causes, such as component failure, maintenance failure, maneuvering mistakes, and the like, the most frequent cause is an according to weather-related.

Conventional aviation weather forecasts have been provided by the World Area Forecasting System (WAFS). For example, in the case of Korea, forecasts are made using WAFS satellite broadcast data transmitted from the ISCS 2 (International Satellite Broadcast System) for Asian and Pacific areas and the SADIS (satellite disribution) system for Asian and Indian ocean areas.

Since such conventional aviation weather forecasting provides weather information about a corresponding area without providing information about altitude information and a flight path necessary for flight operation, like a weather forecast provided by a meteorological office, therefore pilots and related persons are difficult to obtain intuitive information.

DISCLOSURE

Technical Problem

The present invention is directed to a method of providing an aviation/marine weather chart that simultaneously provides an air or marine navigation flight path and aviation/marine weather information about the air or marine navigation flight path, and an electronic device for implementing the same.

The present invention is further directed to a method of providing an aviation/marine weather chart that provides the aviation/marine weather chart in consideration of a time at which a flight enters a flight information region or a time at which a ship enters a maritime information area, and an electronic device for implementing the same.

The problems to be solved by the present invention are not limited to the above-described problems, and problems not described above should be understood by a person of ordinary skill in the art to which the present invention pertains from this disclosure and the accompanying drawings.

Technical Solution

One aspect of the present invention may provide an aviation weather chart apparatus including a communication unit, which is connected to a weather server and an flight path server, to obtain aviation weather information from the weather server, to obtain flight path information from the flight path server, and to obtain flight identification information from the network; and a control unit that obtains flight path information corresponding to the flight identification information, sets a flight information region through which a flight passes according to the flight path information, obtains aviation weather information about the flight information region, sets a flight path according to the flight path information, and obtains an aviation weather chart showing at least a part of the flight information region, the aviation weather information about the set flight information region, and the flight path.

Another aspect of the present invention may provide a method of providing an aviation weather chart that includes obtaining flight identification information to identify a flight; obtaining flight path information corresponding to the flight identification information among multiple pieces of flight path information; setting a flight information region through which a flight passes according to the obtained flight path information and obtaining aviation weather information about the set flight information region; setting a flight path according to the obtained flight path information and obtaining an aviation weather chart that displays at least a part of the flight information region, the aviation weather information about the set flight information region, and the flight path; and outputting the aviation weather chart.

Still another aspect of the present invention may provide a recording medium on which a program for implementing the above-described method is recorded.

The technical solution of the problem in the present invention is not limited to the above-described solutions, and the solutions not described above should be understood by a person of ordinary skill in the art to which the present invention pertains from this disclosure and the accompanying drawings.

Advantageous Effects

The present invention can more intuitively provide aviation weather information required for flight operation by simultaneously providing aviation weather information related to a flight path and the flight path.

Further, the present invention can more precisely provide information about weather change due to flight movement by providing an aviation weather chart in consideration of a time at which a flight enters a flight information region.

The effects of the present invention are not limited to the above-described effects, and effects not described above should be understood by a person of ordinary skill in the art to which the present invention pertains from this disclosure and the accompanying drawings.

DESCRIPTION OF DRAWINGS

FIG. 6 illustrates an example of information about a flight information region according to an exemplary embodiment of the present invention.

BEST MODE

Figure 1:
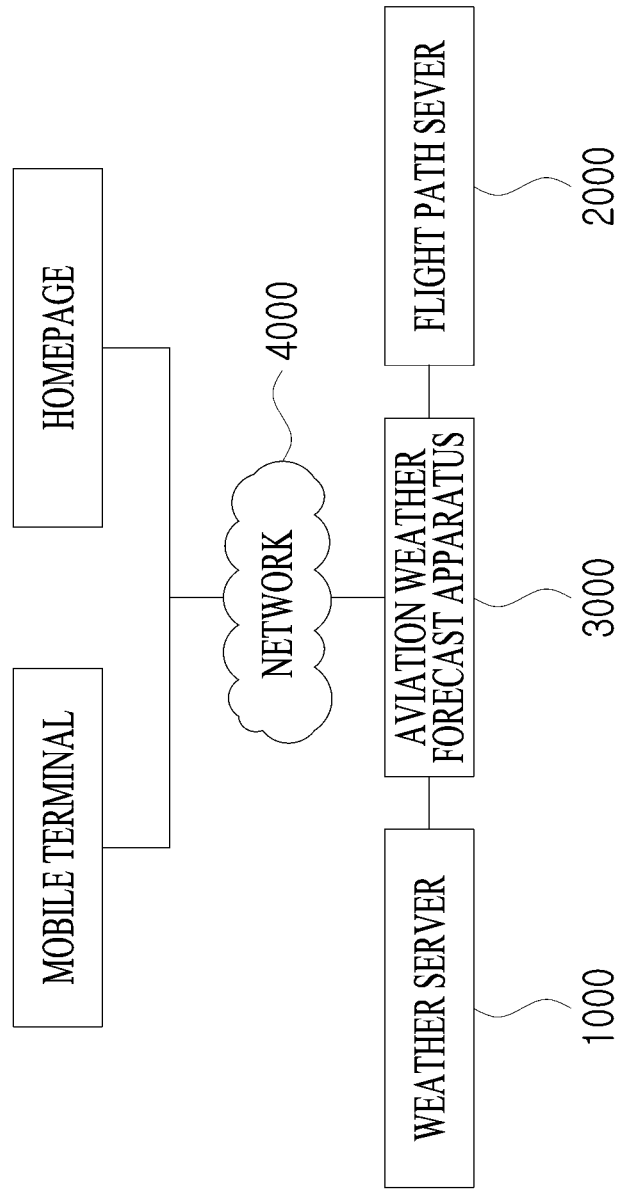
FIG. 1 illustrates an environmental diagram of an aviation weather chart system according to an exemplary embodiment of the present invention.

One aspect of the present invention may provide an aviation weather chart apparatus including a communication unit which is connected to a weather server and an flight path server configured to obtain aviation weather information from the weather server, obtain flight path information from the flight path server, and obtain flight identification information from a network; and a control unit configured to obtain flight path information corresponding to the flight identification information, set a flight information region through which a flight passes according to the flight path information, obtain aviation weather information about the flight information region, set a flight path according to the flight path information, and obtain an aviation weather chart showing at least a part of the flight information region, the aviation weather information about the set flight information region, and the flight path.

MODES OF THE INVENTION

The foregoing objects, features, and advantages of the present invention will become more apparent from the following detailed description related to the accompanying drawings. However, it should be understood that the present invention may be subject to various modifications and embodiments, and hereinafter, particular exemplary embodiments of the present invention will be described in detail with reference to the accompanying drawings.

In the drawings, the thicknesses of layers and areas are exaggerated for clarity, and when an element or layer is referred to as being "on" or "upon" another element or layer, the element or layer may not only be directly over the other element or layer but intervening layers or other elements may exist between the element or layer and the other element or layer. Like reference numerals designate like elements throughout this disclosure. Further, the same reference numerals will be used to designate the elements that have the same function within the same scope and spirit shown in the drawings of the exemplary embodiments.

The detailed description of known functions and configurations incorporated herein will be omitted when it may unnecessarily obscure the subject matter of the present invention. Also, numerals (e.g., first, second, and the like) used in the description of the present invention are merely an identifier for distinguishing one element from another.

Additionally, the suffixes "module" and "unit" for elements used in the following description are given or mixed in consideration of convenience for drafting the specification, and do not have their own distinguishing meaning or role.

One aspect of the present invention may provide an aviation weather chart apparatus including a communication unit which is connected to a weather server and an flight path server to obtain aviation weather information from the weather server and obtain flight path information from the flight path server, and obtains flight identification information from a network; and a control unit that obtains flight path information corresponding to the flight identification information, sets a flight information region through which a flight passes according to the flight path information, obtains aviation weather information about the flight information region, sets a flight path according to the flight path information, and obtains an aviation weather chart showing at least a part of the flight information region, the aviation weather information about the set flight information region, and the flight path.

Further, the aviation weather information may include at least one of BUFR information, GRIB information, METAR, SPECI, TAF, SIGMET, ARFOR, ROFOR, AIREP, and a notice to airmen (NOTAM).

Additionally, the flight path information may include at least one of entire flight information region information, pass flight information region information, path information, departure airport information, arrival airport information, and transit information.

Additionally, the aviation weather chart may include at least one of a significant weather chart, a chart of wind and temperature, a turbulence chart, a chart of wind and temperature/humidity by altitude, a chart of turbulence by altitude, a satellite image chart, and a radar image chart.

Additionally, the significant weather chart may include information about a weather change in a range wider than or equal to a predetermined range that occurs in the flight information region through which the flight passes.

Additionally, the chart of wind and temperature may include information about at least one of a temperature, a wind direction, and a wind speed at a predetermined point of the flight information region through which the flight passes.

The turbulence chart may include information about a turbulence occurrence area of the flight information region through which the flight passes.

Additionally, the turbulence by altitude chart may include an altitude at which turbulence occurs, an area at which turbulence occurs, and an altitude by flight distance of the flight.

Additionally, the control unit may obtain the aviation weather chart in further consideration of a time at which the flight enters the flight information region and a forecast period of the aviation weather information.

Additionally, the control unit may obtain aviation weather information at a time adjacent to the time at which the flight information region is entered among aviation weather information by time included in the aviation weather information, as the aviation weather chart of the flight information region.

Additionally, the control unit may obtain aviation weather information for the closest time out of aviation weather information for a previous time to the time at which the flight enters the flight information region among the aviation weather information by time, as the aviation weather chart of the flight information region.

Additionally, the aviation weather chart apparatus may further include a display unit for visually outputting the aviation weather chart.

Additionally, the control unit may control the communication unit to transmit the aviation weather chart to a network connected to the communication unit.

Another aspect of the present invention may provide a method of providing an aviation weather chart that includes obtaining flight identification information to identify a flight; obtaining flight path information corresponding to the flight identification information among multiple pieces of flight path information; setting a flight information region through which the flight passes according to the obtained flight path information and obtaining aviation weather information about the set flight information region; setting a flight path according to the obtained flight path information and obtaining an aviation weather chart that displays at least a part of the flight information region, the aviation weather information about the set flight information region, and the flight path; and outputting the aviation weather chart.

Further, the aviation weather information may include at least one of BUFR information, GRIB information, METAR, SPECI, TAF, SIGMET, ARFOR, ROFOR, AIREP, and NOTAM.

Additionally, the flight path information may include at least one of entire flight information region information, pass flight information region information, path information, departure airport information, arrival airport information, and transit information.

Additionally, the aviation weather chart may include at least one of a significant weather chart, a chart of wind and temperature, a turbulence chart, a chart of wind and temperature/humidity by altitude, a chart of turbulence by altitude, a satellite image chart, and a radar image chart.

Additionally, the significant weather chart may include information about a weather change in a range wider than or equal to a predetermined range that occurs in the flight information region through which the flight passes.

Additionally, the wind and temperature chart may include information about at least one of a temperature, a wind direction, and a wind speed at a predetermined point of the flight information region through which the flight passes.

Additionally, the turbulence chart may include information about a turbulence occurrence area of the flight information region through which the flight passes.

Additionally, the turbulence by altitude chart may include an altitude at which turbulence occurs, an area at which turbulence occurs, and an altitude by flight distance of the flight.

Additionally, the obtaining of the aviation weather chart may include obtaining the aviation weather chart in further consideration of a time at which the flight enters the flight information region and a forecast period of the aviation weather information.

Additionally, the aviation weather chart may display at least one of the time at which the flight enters the flight information region, a time at which the flight departs from a departure airport, and a time at which the flight arrives at an arrival airport.

Additionally, the obtaining of the aviation weather chart may include obtaining the aviation weather chart to display aviation weather information at a time adjacent to the time at which the flight information region is entered among aviation weather information by time included in the aviation weather information on the flight information region.

Additionally, the obtaining of the aviation weather chart may include obtaining the aviation weather chart to display aviation weather information for the closest time out of aviation weather information for a previous time to the time at which the flight enters the flight information region among the aviation weather information by each time included in the aviation weather information on the flight information region.

Additionally, the outputting of the aviation weather chart may include visually outputting the aviation weather chart through the display unit.

Additionally, the outputting of the aviation weather chart may include transmitting the aviation weather chart to a network connected to the communication unit.

Still another aspect of the present invention may provide a recording medium on which a program for implementing the above-described method is recorded.

Hereinafter, an aviation/marine weather chart system according to the exemplary embodiment of the present invention will be described.

The aviation/marine weather chart system according to the present invention may include an aviation weather chart system and a marine weather chart system. However, hereinafter, for convenience of description, the aviation chart system will be mainly described with respect to the aviation/marine weather chart system.

Meanwhile, various elements described as being in the aviation weather chart system may be applied to the marine weather chart system. For instance, an aviation weather chart apparatus in the aviation weather chart system may be replaced by a marine weather chart apparatus in the marine weather chart system.

FIG. 1 illustrates an environmental diagram of the aviation weather chart system 10000 according to an exemplary embodiment of the present invention.

Referring to FIG. 1, the aviation weather chart system 10000 may include a weather server 1000, a flight path server 2000, and an aviation weather chart apparatus 3000.

The weather server 1000 may provide aviation weather information for an aviation weather chart to the aviation weather chart apparatus 3000, and the flight path server 2000 may provide flight path information about an flight path assigned to a flight to the aviation weather chart apparatus 3000. The aviation weather chart apparatus 3000 may obtain aviation weather information about the flight path based on the aviation weather information and the flight path information.

The weather server 1000 may acquire the aviation weather information and transmit the acquired aviation weather information to the aviation weather chart apparatus 3000. For example, the weather server 1000 could be the World Area Forecast System (WAFS).

The aviation weather information may include at least one of BUFR information, GRIB information, METAR, SPECI, TAF, SIGMET, ARFOR, ROFOR, AIREP, and NOTAM. In this case, the BUFR information may include information about at least one of a jet stream, a cumulonimbus, clear air turbulence, a tropical storm, and volcanic ash, and the GRIB information may include information about at least one of an upper wind, a temperature, a tropopause altitude, humidity, and a maximum wind. Further, the SPECI may include information about a kind of weather that changed over a particular reference, for example, "wind shift" about a change over a predetermined reference of at least one of a wind direction and a wind speed, "visibility" about a change over a predetermined reference of visibility, "thunderstorm" about the occurrence and extinction of thunderstorms, "ceiling" about a sudden change in an elevation limitation, and "sky condition" about the formation or extinction of clouds below a predetermined altitude.

The TAF may include weather information for an airport, the ARFOR may include the weather information for the flight information region, and the ROFOR may include the weather information for the flight path. Further, the AIREP may include weather information obtained from a flying aircraft.

The flight path server 2000 may obtain the flight path information about the flight path assigned to the flight and transmit the obtained flight path information to the aviation weather chart apparatus 3000. In this case, the flight path information may include a flight path assigned to each flight, and the flight path server 2000 could be, for example, a server of an airline managing the flight.

The flight path server 2000 may transmit the flight path information to the aviation weather chart apparatus 3000 at a request of the aviation weather chart apparatus 3000, or transmit the flight path information to the aviation weather chart apparatus 3000 at a predetermined time. In this case, the predetermined time could be a time arbitrarily determined by a user and a time period determined by the user. For example, the flight path server 2000 could transmit the flight path information to the aviation weather chart apparatus 3000 at the time predetermined by the user, such as 9:00, 12:00, 15:00, and the like, and transmit the flight path information to the aviation weather chart apparatus 3000 at a predetermined time period, such as a one hour-period, a two hour-period, a three hour-period, and the like. Meanwhile, the weather information announced at each period may include weather information with a predetermined time interval from an announcement time to the above predetermined time interval. In other words, the weather information released at 9 o'clock in the morning may include weather information at one hour-intervals (i.e., pieces of weather information for 9 o'clock, 10 o'clock, 11 o'clock in the morning, . . . , 7 o'clock, 8 o'clock, and 9 o'clock in the evening) until 9 o'clock that evening (i.e., until 12 hours later) for each flight information region.

The aviation weather chart apparatus 3000 may obtain the aviation weather chart.

The aviation weather chart apparatus 3000 may obtain the aviation weather information from the weather server and obtain the flight path information from the flight path server 2000. The aviation weather chart apparatus 3000 may obtain the aviation weather chart on the basis of the aviation weather information and the flight path information.

The aviation weather chart apparatus 3000 may be connected to an obtained network and may provide the aviation weather chart to a mobile terminal or homepage via the network. In this case, the network may include at least one of a wired network and a wireless network.

Figure 2:
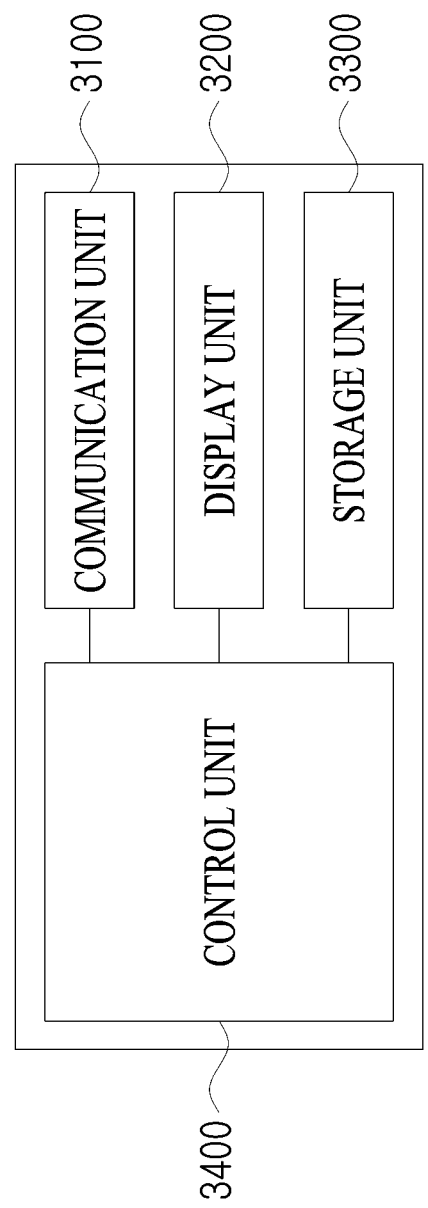
FIG. 2 illustrates a block diagram of an aviation weather chart apparatus according to an exemplary embodiment of the present invention.

FIG. 2 illustrates a block diagram of the aviation weather chart apparatus 3000 according to the exemplary embodiment of the present invention.

Referring to FIG. 2, the aviation weather chart apparatus 3000 may include a communication unit 3100, a display unit 3200, a storage unit 3300, and a control unit 3400. The communication unit 3100 may receive at least one of the aviation weather information and the flight path information and transmit the aviation weather chart to the network. The display unit 3200 may output the aviation weather chart visually, and the storage unit 3300 may store data required for the aviation weather chart in advance. Further, the control unit 3400 may obtain the aviation weather chart and control operation of the configuration included in the aviation weather chart apparatus 3000.

The communication unit 3100 may be connected to the weather server 1000, the flight path server 2000, and the network.

The communication unit 3100 may be connected to the weather server 1000, the flight path server 2000, and the network by a wired communication method or wireless communication method. For instance, the communication unit 3100 may be connected to an advertisement bidding company server 1000 or an advertisement 230 provider server by a wired communication method such as a local area network (LAN), an wide area network (WAN), Ethernet, a USB method, a telephone line method, a power line method, a serial method, and a parallel method. Further, the communication unit 3100 may be connected to the weather server 1000, the flight path server 2000, and the network using a wireless communication method such as WiFi, Bluetooth, ZigBee, WiGig, a radio frequency identification (RFID), an infrared data association (IrDA), an ultra wideband (UWB), and WiHD.

The display unit 3200 may visually output the aviation weather chart and output a graphic user interface (GUI) required for the aviation weather chart.

The storage unit 3300 may store the data necessary for obtaining the aviation weather chart in advance.

The control unit 3400 may obtain the aviation weather chart on the basis of the aviation weather information and the flight path information and control operations of the units included in the aviation weather chart apparatus 3000. For example, the control unit 3400 may perform control such that the communication unit 3100 transmits the obtained aviation weather chart to the network 4000 and control such that the display unit 3200 visually outputs the obtained aviation weather chart.

In the above, the aviation weather chart system was mainly described with respect to the aviation/marine weather chart system. However, when the aviation weather chart system is replaced by a marine weather chart system in the above description, the aviation weather information may be replaced by marine weather information. Here, the marine weather information may include a part of the information included in the aviation weather information, and may further include information not included in the aviation weather information. For example, the marine weather information may include various weather factors that do not have a significant impact on aircraft operations but on ship operations. Typical examples of such weather factors may include information on a wave height and a wave, tidal information, ocean current information, information on a wind direction and a wind speed at low altitude, information on drift ice, and the like.

Hereinafter, a method of providing an aviation/marine weather chart will be described. With respect to the method of providing an aviation/marine weather chart, a method of providing an aviation weather chart will be mainly described like the aviation weather chart system mainly described with respect to the aviation/marine weather chart system above. However, it should be noted that since such description is merely for convenience of the description, a method of providing a marine weather chart may be implemented by modifying a part of the method of providing an aviation weather chart described below. Of course, in this case, a person of ordinary skill in the art may need to make obvious modifications such that marine weather information including wave height information and the like should be used instead of aviation weather information. However, it should be obvious that such a degree of modification should also be construed as falling within the spirit of the present invention that relates to the method of providing an aviation weather chart, and a system, an apparatus, and an electronic device for implementing the same.

Figure 3:
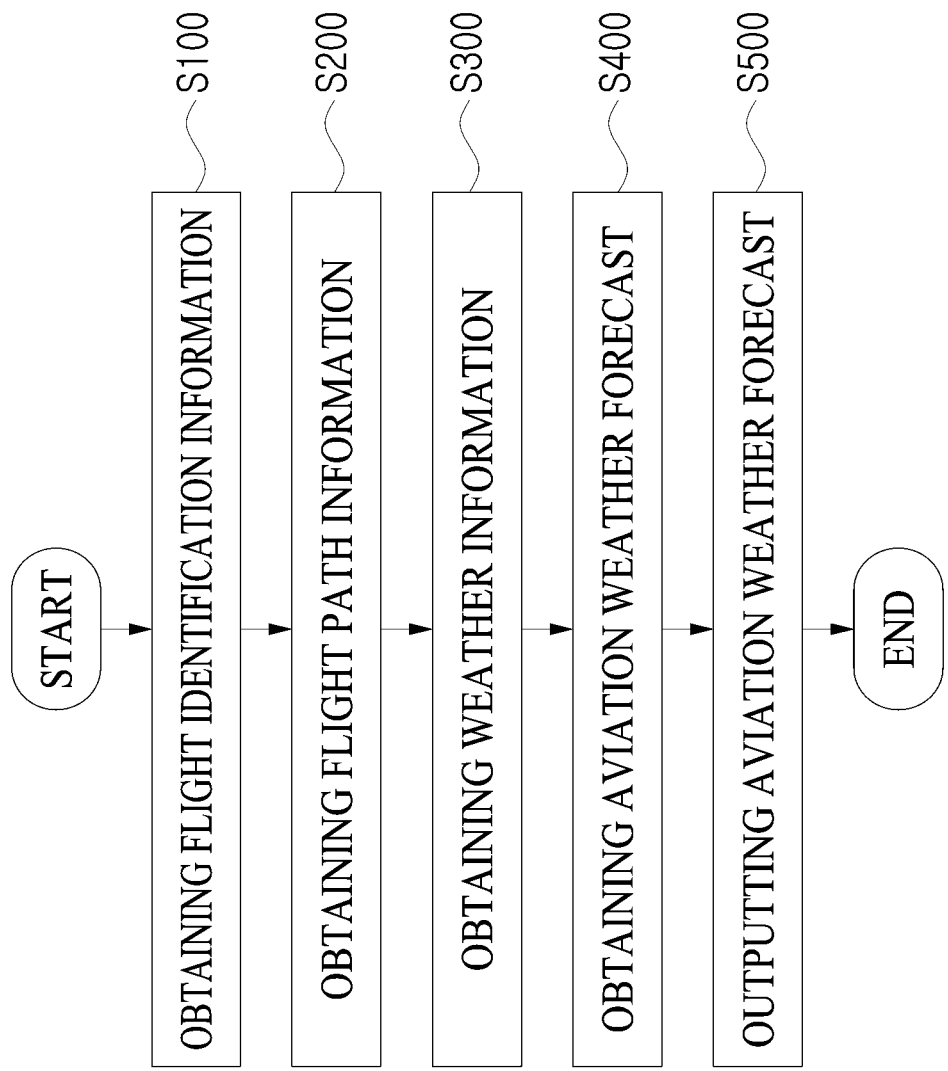
FIG. 3 illustrates a flowchart of a method of providing an aviation weather chart according to an exemplary embodiment of the present invention.

FIG. 3 illustrates a flowchart of a method of providing an aviation weather chart according to the exemplary embodiment of the present invention.

Referring to FIG. 3, the method of providing an aviation weather chart may include obtaining flight identification information (S100), obtaining flight path information (S200), obtaining aviation weather information (S300), obtaining an aviation weather chart (S400), and outputting the aviation weather chart (S500).

The obtaining of the flight identification information (S100) may include obtaining the flight identification information from at least one of a user and an external electronic device, and the obtaining of the flight path information (S200) may include obtaining the flight path information from the flight path server 2000. The obtaining of the aviation weather information (S300) may include obtaining the aviation weather information from the weather server 1000, and the obtaining of the aviation weather chart (S400) may include obtaining the aviation weather chart on the basis of the flight path information and the aviation weather information. Further, the outputting of the aviation weather chart (S500) may include outputting the obtained aviation weather chart to the outside.

The control unit 3400 may obtain the flight identification information (S100).

The control unit 3400 may obtain the flight identification information from an external electronic device (not shown) through the communication unit 3100, and obtain the flight identification information from a user through a separate input apparatus (not shown) included in the aviation weather chart apparatus 3000.

The control unit 3400 may obtain the flight path information (S200).

The control unit 3400 may obtain flight path information corresponding to the flight identification information.

The control unit 3400 may transmit the flight identification information to the flight path server 2000 through the communication unit 3100 to obtain the flight path information corresponding to the flight identification information, and request that the flight path server 2000 transmit the flight path information corresponding to the transmitted flight identification information back to the control unit 3400.

The flight path server 2000 may transmit the flight path information corresponding to the flight identification information requested from the aviation weather chart apparatus 3000 among pre-recorded entire flight path information to the aviation weather chart apparatus 3000.

The flight path information may include at least one of entire flight information region information about predetermined entire flight information regions, pass flight information region information about flight information regions through which the flight passes, path information about a path along which the flight moves, departure airport information about an airport from which the flight departs, arrival airport information about an airport at which the flight arrives, and transit information about a layover airport at which the flight stops while traveling. For example the flight path information may include the identification information about a first flight information region D1 and second flight information region D2 through which the flight passes and information about areas at which the first flight information region D1 and the second flight information region D2 are located, for another example, information about coordinates, such as latitude and longitude, at which an aircraft is located according to each time zone during traveling, for still another example, identification information of the airport from which the flight departs and information about a departure time, a runway (in case of marine chart a port, a harbor etc.) to be used, and the like.

In the above, although the control unit 3400 was described as obtaining the flight path information corresponding to the flight identification information from the flight path server 2000, the control unit 3400 is not limited thereto and may obtain the flight path information corresponding to the flight identification information from the entire flight path information pre-recorded in the storage unit 3300.

The aviation weather chart apparatus 3000 may receive the flight path information from the flight path server 2000 at a predetermined time and record the received flight path information on the storage unit 3300.

Figure 4:
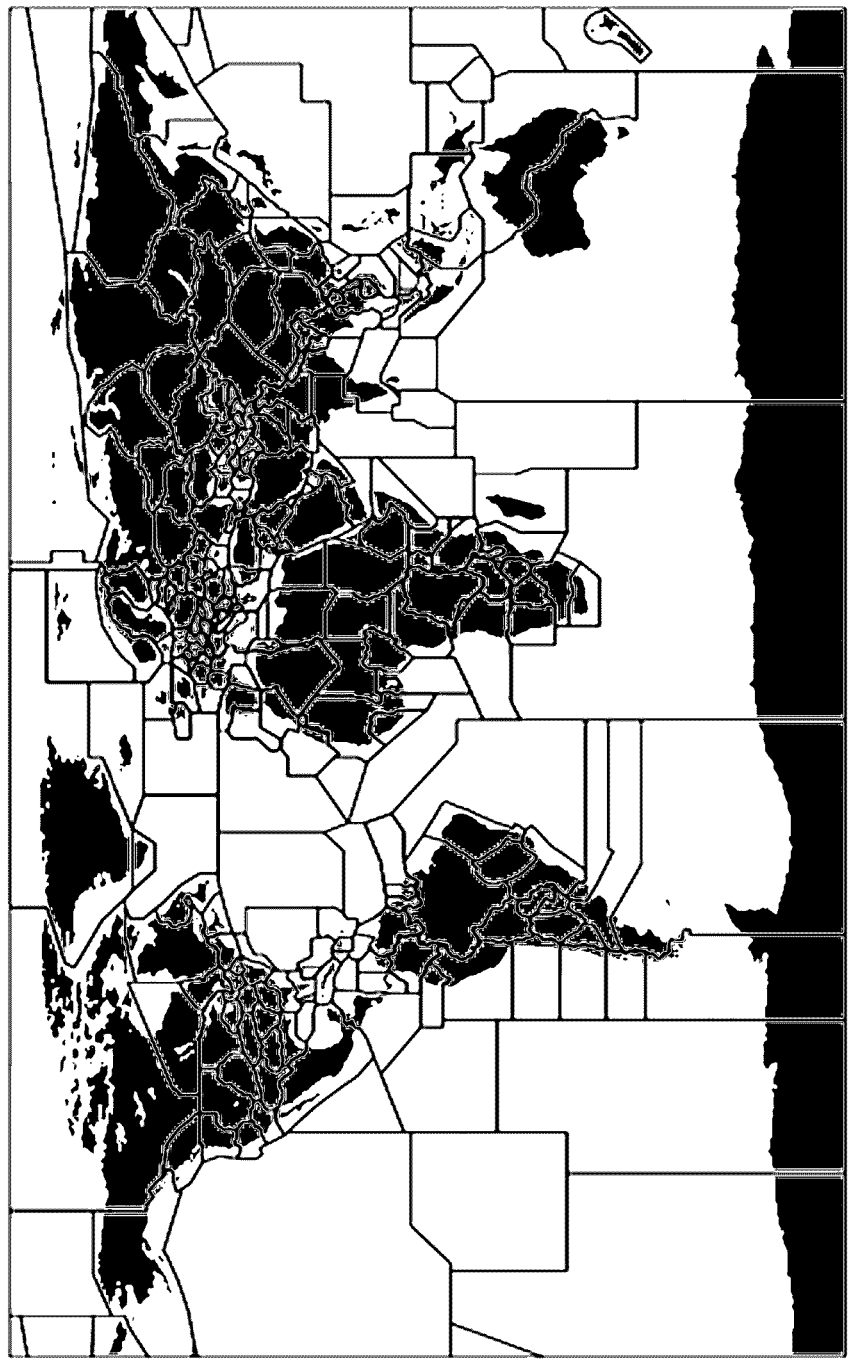
FIG. 4 illustrates an example of information about a flight information region according to an exemplary embodiment of the present invention.

FIG. 4 illustrates an example of the information about the flight information region according to the exemplary embodiment of the present invention.

The flight information region may be set as a public area on Earth, as shown in FIG. 4.

The flight information region may include a space defined by a predetermined height from a surface or sea level to ensure that aircraft and the like have safe activities.

The aviation weather chart apparatus 3000 may record the flight information region information about at least one of a range, coordinates, positions, and boundaries of the flight information region on the storage unit 3300 beforehand. The aviation weather chart apparatus 3000 may obtain the flight information region information from the flight path server 2000 and prerecord it on the storage unit 3300, or may obtain the flight information region information through a separate input apparatus (now shown) and prerecord it on the storage unit 3300.

Figure 5:
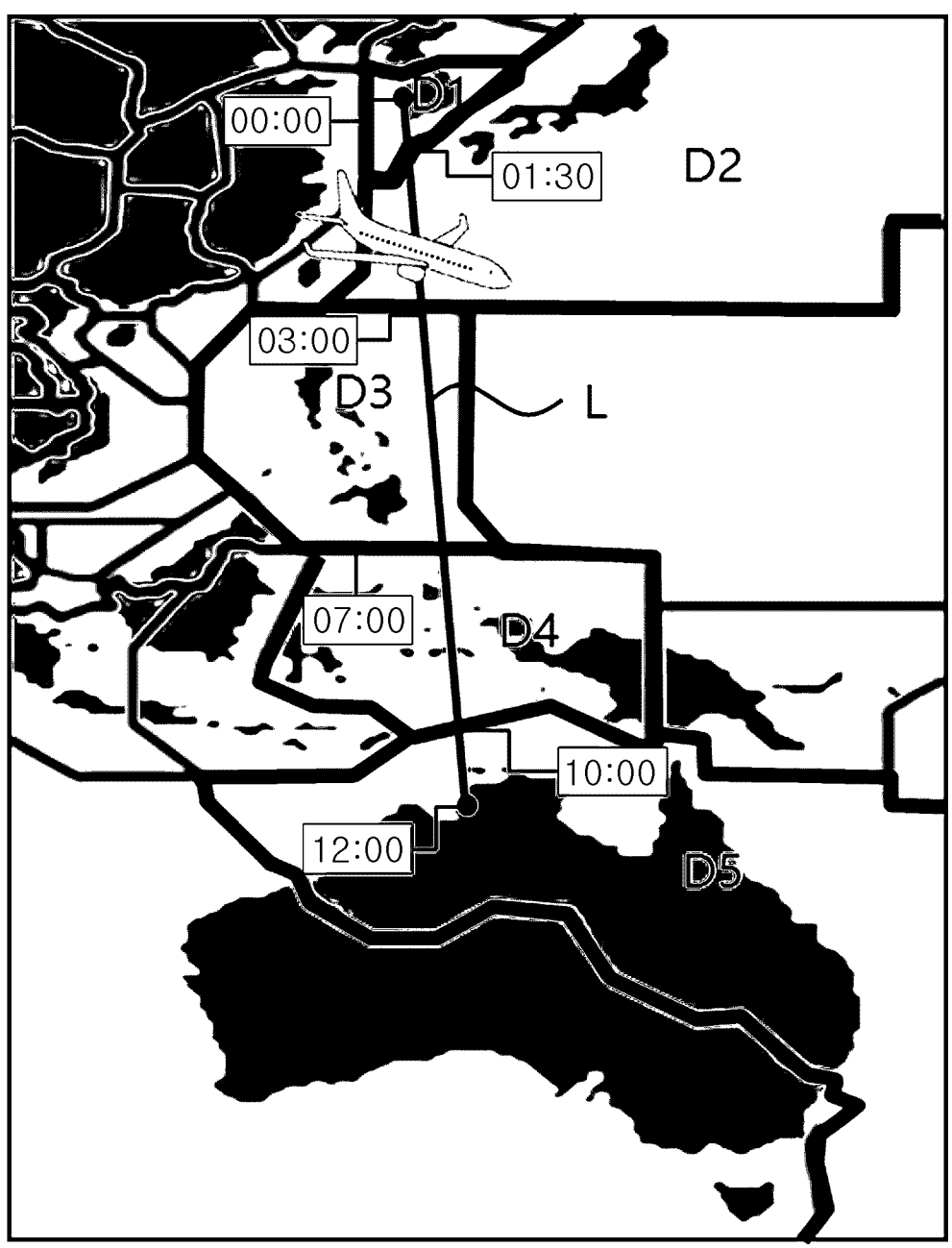
FIG. 5 illustrates an example of setting forecast flight information regions related to a flight path according to an exemplary embodiment of the present invention.

FIG. 5 illustrates an example of setting the flight information regions related to the flight path according to the exemplary embodiment of the present invention.

The control unit 3400 may obtain a pass flight information region through which a flight passes based on flight path information.

When the aircraft travels from Incheon Airport in Korea to Darwin Airport in Australia through an flight path L, as shown in FIG. 5, the control unit 3400 may obtain the first flight information region D1, the second flight information region D2, a third flight information region D3, a fourth flight information region D4, and a fifth flight information region D5 as pass flight information regions.

A time at which the flight passes through the flight information region may be determined according to a flight distance, a flight path, a departure airport, an arrival airport, a departure time, an arrival time, and the like.

The aviation weather chart apparatus 3000 may obtain the pass flight information region information from the flight path server 2000, and the pass flight information region information may include a time at which the flight enters the pass flight information region.

FIG. 6 illustrates an example of the information about the pass flight information regions according to the exemplary embodiment of the present invention.

As shown in FIG. 6, a flight may enter ZSHA flight information region 28 minutes after flight departure, leave ZSHA flight information region 13 minutes later, and enter ZYSH flight information region. Therefore, the flight may obtain a time at which the flight enters the pass flight information region based on the elapsed time since the flight departure such as the flight entering the ZYSH flight information region 41 minutes after the flight departure.

In FIG. 6, the time at which the flight enters the pass flight information region is shown as the elapsed time since the flight departure, but is not limited thereto, and the aviation weather chart apparatus 3000 may obtain an entry time of the pass flight information region in a standard time at the time of entering the flight information region. For example, the entry time of the pass flight information region may be obtained such that when the departure time of the flight is 00:00 am, the flight may enter the ZSHA flight information region at 00:28 am, and may leave the ZSHA flight information region and enter the ZYSH flight information region at 00:41 am. Further, the aviation weather chart apparatus 3000 may obtain the pass flight information region time in a standard time that further reflects a time difference of pass flight information regions.

The control unit 3400 may obtain the aviation weather information (S300).

The control unit 3400 may obtain the aviation weather information from the weather server 1000.

The control unit 3400 may obtain the aviation weather information corresponding to the flight path information.

The control unit 3400 may transmit the flight path information to the weather server 1000 through the communication unit 3100 to obtain aviation weather information corresponding to the flight path information, and may request that the weather server 1000 transmit the aviation weather information corresponding to the transmitted flight path information.

The weather server 1000 may transmit the aviation weather information corresponding to the flight path information requested by the aviation weather chart apparatus 3000 among the pre-recorded entire aviation weather information to the aviation weather chart apparatus 3000. For example, when the flight path information received by the weather server 1000 from the aviation weather chart apparatus 3000 is the first flight information region D1 and second flight information region D2 through which the flight passes, the weather server 1000 may transmit aviation weather information about the first flight information region D1 and second flight information region D2 to the aviation weather chart apparatus 3000. In this case, the aviation weather information may include at least one of BUFR information, GRIB information, METAR, SPECI, TAF, SIGMET, ARFOR, ROFOR, AIREP, and NOTAM. In the case, the BUFR information may include information about at least one of a jet stream, a cumulonimbus, clear air turbulence, a tropical storm, and volcanic ash, and the GRIB information may include information about at least one of an upper wind, a temperature, a tropopause altitude, humidity, and a maximum wind. Further, the SPECI may include information about a weather that changed over a particular reference, for example, "wind shift" about a change over a predetermined reference of at least one of a wind direction and a wind speed, "visibility" about a change over the predetermined reference of visibility, "thunderstorm" about the occurrence and extinction of thunderstorms, "ceiling" about a sudden change in an elevation limitation, and "sky condition" about the formation or extinction of clouds below a predetermined altitude.

The aviation weather information may include the weather forecast regarding the flight during a predetermined amount of time from a flight departure time. For instance, the aviation weather information may include weather forecast regarding the flight for 12 hours from the flight departure time.

In addition, the aviation weather information may include the weather forecast regarding the flight of a predetermined period during a predetermined amount of time. For example, when the aviation weather information is the weather forecast regarding the flight for 12 hours from the flight departure time, the aviation weather information may include a weather forecast at 3 hour-intervals (this interval is not an announcement period but a time interval within announced information). More specifically, the aviation weather information may include a weather forecast about the flight at the flight departure time, a weather forecast about the flight 3 hours after the flight departure time, a weather forecast about the flight 6 hours after the flight departure time, a weather forecast about the flight 9 hours after the flight departure time, and a weather forecast about the flight 12 hours after the flight departure time.

The control unit 3400 may obtain the aviation weather chart (S400).

The control unit 3400 may obtain the aviation weather chart on the basis of the flight path information and the aviation weather information.

The aviation weather chart may include at least one of a significant weather chart, a wind and temperature chart, a turbulence chart, a wind and temperature/humidity by altitude chart, a turbulence by altitude chart, a satellite image chart, and a radar image chart.

The control unit 3400 may obtain the aviation weather chart on the basis of the pass flight information region information and the aviation weather information included in the flight path information, and may obtain the aviation weather chart in further consideration of a time at which the flight enters the flight information region.

Figure 7:
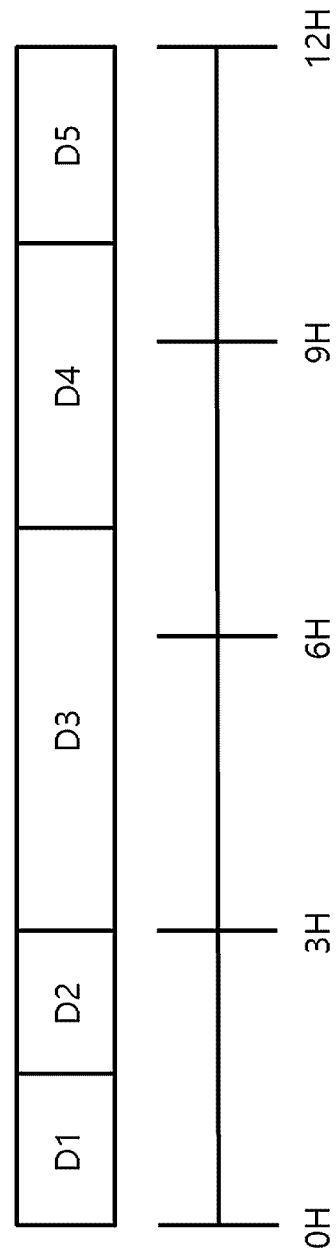
FIG. 7 illustrates an example of a flight time for each pass flight information region according to an exemplary embodiment of the present invention.

FIG. 7 illustrates an example of an entry time of each pass flight information region according to the exemplary embodiment of the present invention.

FIG. 7 shows a relationship between the entry time of each pass flight information region and a forecast period of a weather forecast when the flight enters the first flight information region D1 at 0H, enters the second flight information region D2 at 1H 30, enters the third flight information region D3 at 3H, enters the fourth flight information region D4 at 7H, and enters the fifth flight information region D5 at 10H.

As shown in FIG. 7, the flight may pass through the first flight information region D1 and second flight information region D2 between aviation weather information at a flight departure time and aviation weather information at 3H of 3 hours later, and enter the third flight information region D3 at the aviation weather information at 3H.

The control unit 3400 may obtain an aviation weather chart about the first flight information region D1 and second flight information region D2 on the basis of aviation weather information at 0H of the flight departure time, and obtain the aviation weather chart about the third flight information region D3 on the basis of the aviation weather information at 3H of 3 hours after the flight departure time.

Also, the control unit 3400 may obtain the aviation weather chart to display a flight departure time at a departure airport, the time at which the flight enters each of the flight information regions, and a flight arrival time at an arrival airport.

For example, as shown in FIG. 5, the control unit 3400 may obtain the aviation weather chart to display the flight departure time at the departure airport, the time at which the flight enters each of the flight information regions, and the flight arrival time at the arrival airport.

Acquisition of the charts included in a more specific aviation weather chart will be described with reference to FIGS. 8 to 14 below.

Figure 8:
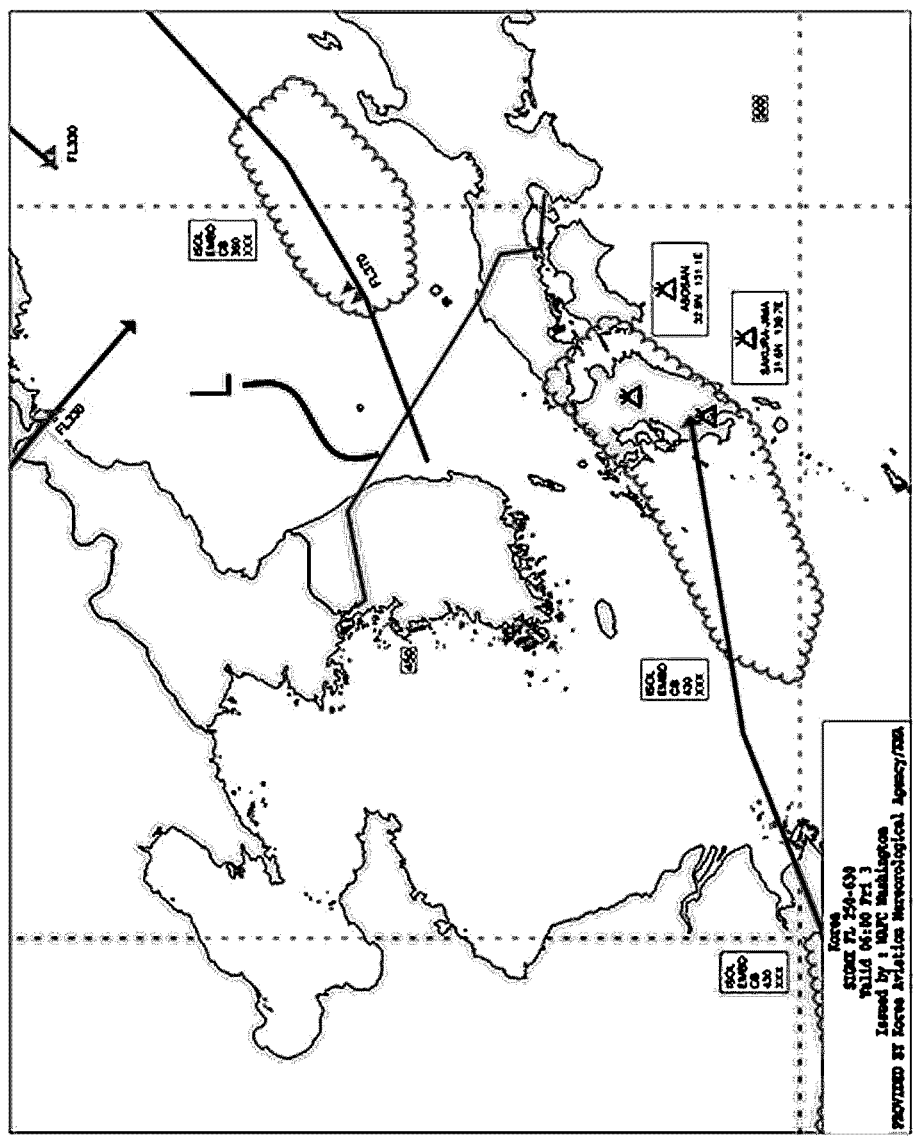
FIG. 8 illustrates an example of a significant weather chart according to an exemplary embodiment of the present invention.

FIG. 8 illustrates an example of a significant weather chart according to the exemplary embodiment of the present invention.

As shown in FIG. 8, the control unit 3400 may obtain a flight information region through which a flight passes, display main weather information about the flight information region, and obtain a significant weather chart showing the flight path on the flight information region.

Figure 9:
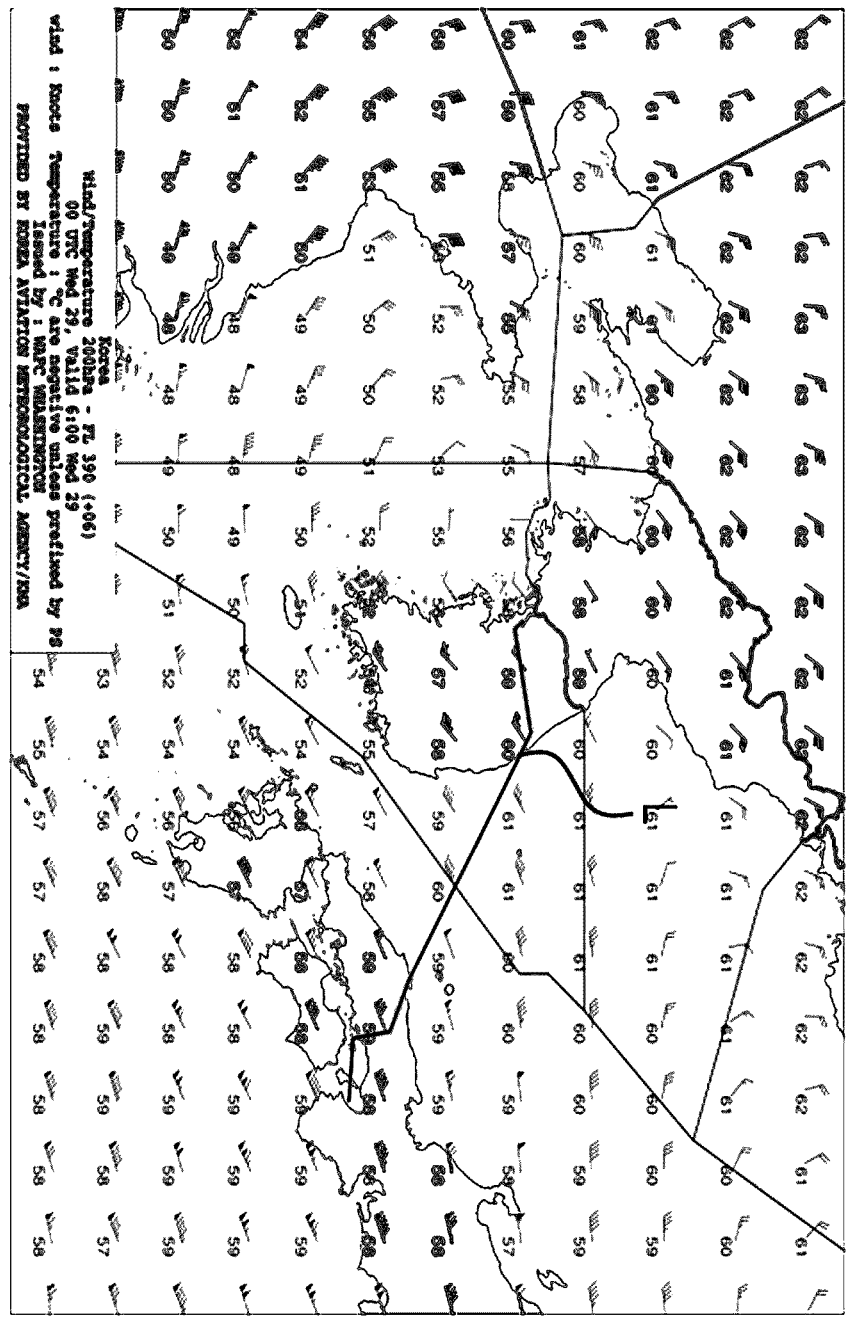
FIG. 9 illustrates an example of a chart of wind and temperature according to an exemplary embodiment of the present invention.

FIG. 9 illustrates an example of a wind and temperature chart according to the exemplary embodiment of the present invention.

As shown in FIG. 9, the control unit 3400 may obtain a flight information region through which a flight passes, display aviation weather information about a wind and temperature of the flight information region, and obtain a wind and temperature chart showing the flight path on the flight information region.

Figure 10:
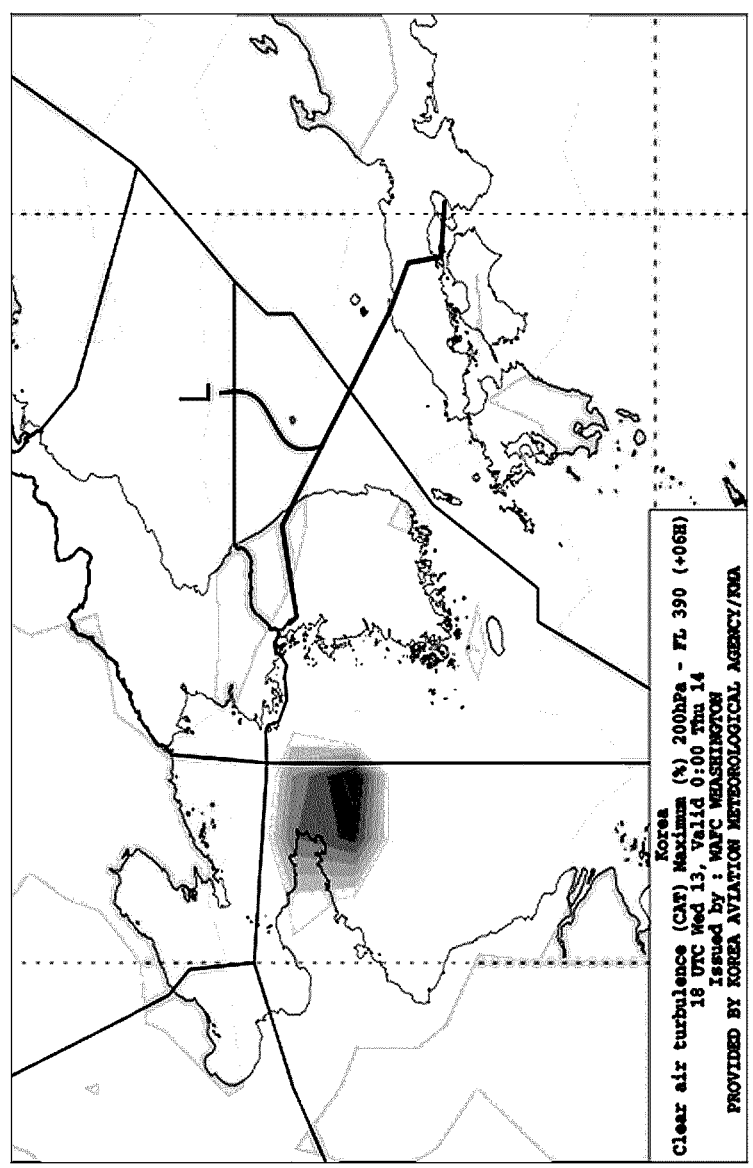
FIG. 10 illustrates an example of a turbulence chart according to an exemplary embodiment of the present invention.

FIG. 10 illustrates an example of a turbulence chart according to the exemplary embodiment of the present invention.

As shown in FIG. 10, the control unit 3400 may obtain a flight information region through which a flight passes, display aviation weather information about an area in which turbulence occurs on the flight information region, and obtain a turbulence chart showing the flight path on the flight information region. In this case, the control unit 3400 may display the area in which turbulence occurs as a turbulence occurrence area on plane coordinates.

Figure 11:
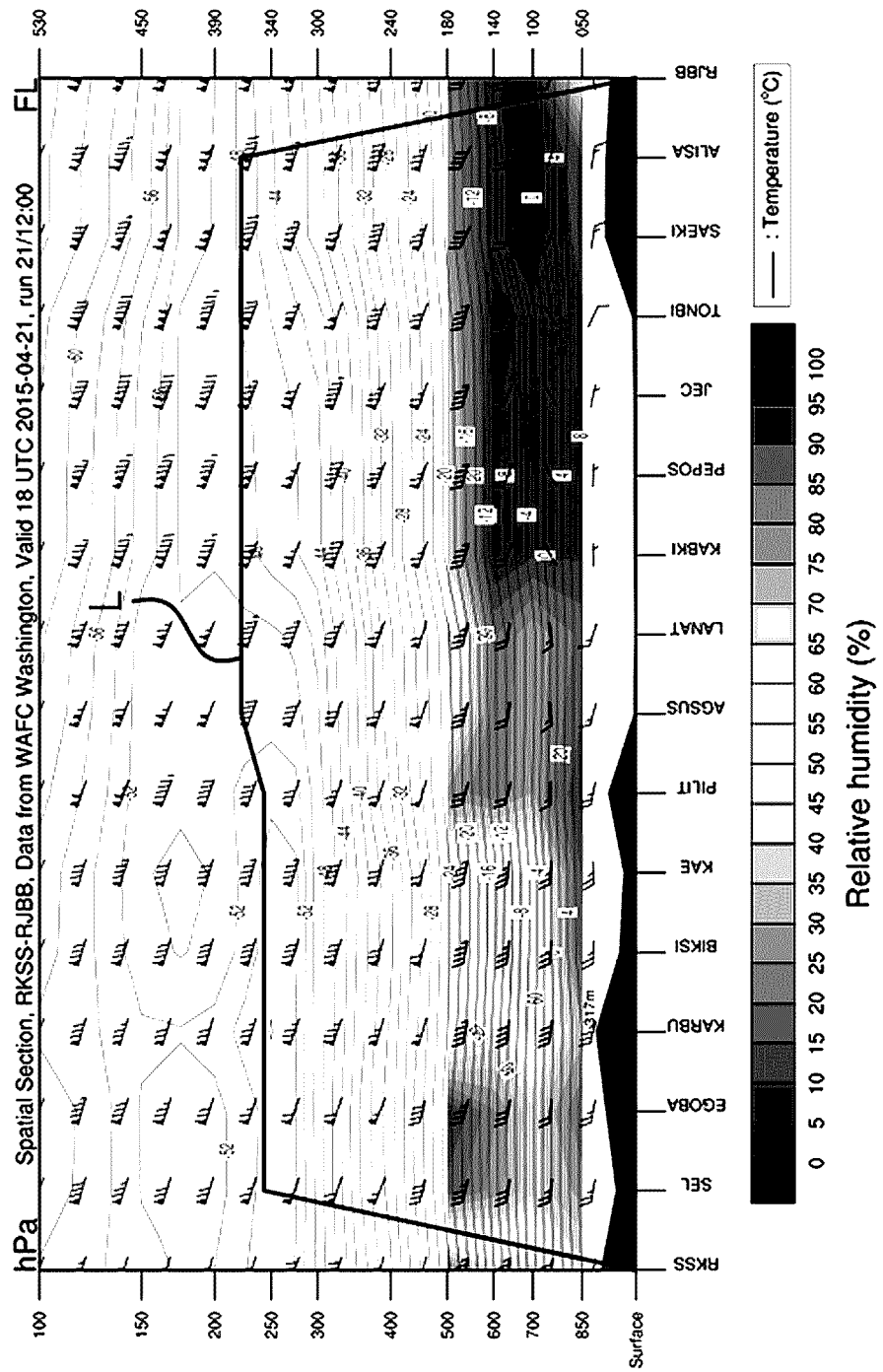
FIG. 11 illustrates an example of a chart of wind and temperature/humidity by altitude according to an exemplary embodiment of the present invention.

FIG. 11 illustrates an example of a wind and temperature/humidity by altitude chart according to the exemplary embodiment of the present invention.

As shown in FIG. 11, the control unit 3400 may obtain a flight information region through which a flight passes and with flight altitude added thereto, display aviation weather information about a wind and temperature by altitude on the flight information region, and obtain an environmental information chart showing an altitude change according to the flight path on the flight information region.

Figure 12:
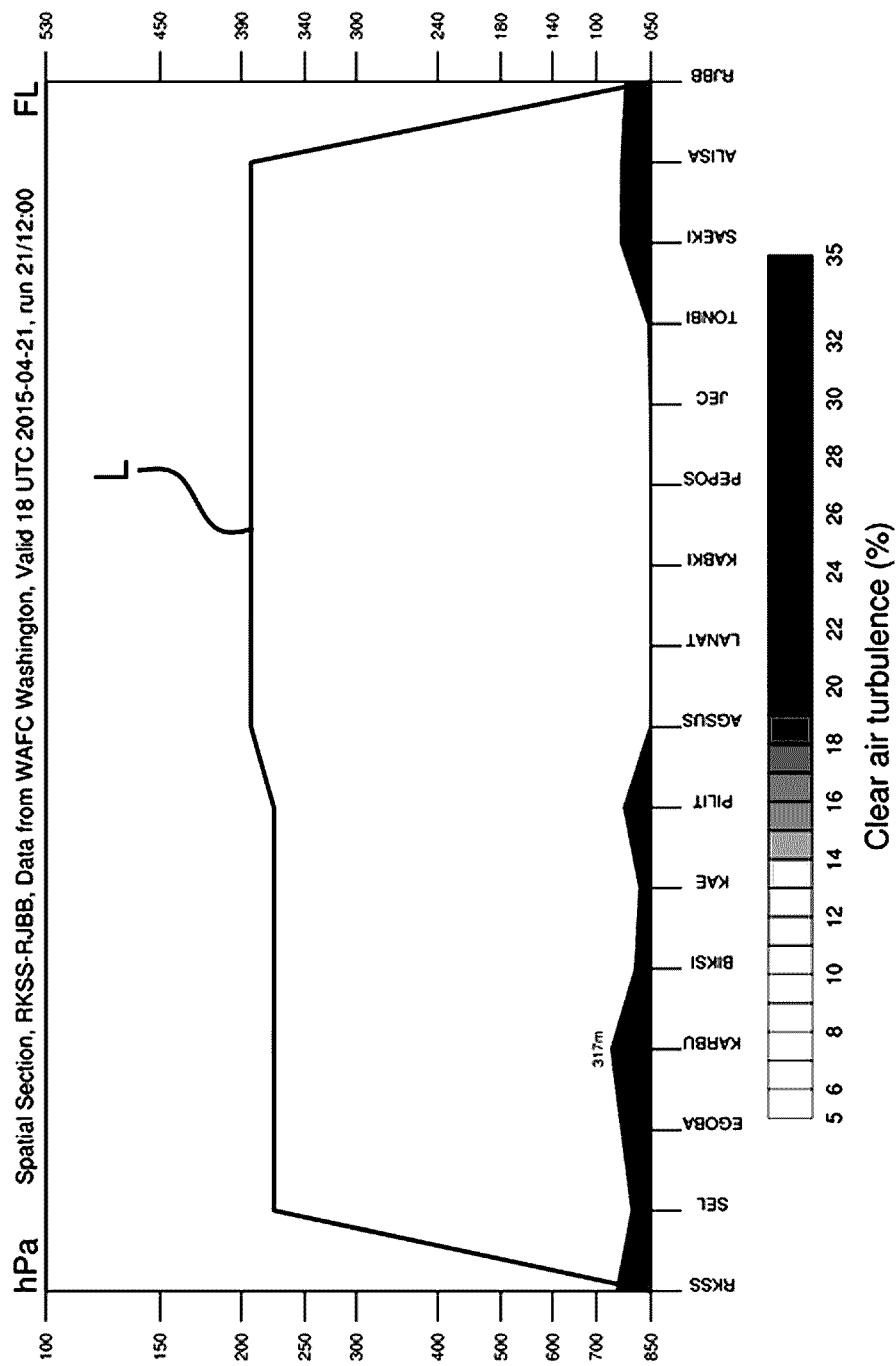
FIG. 12 illustrates an example of a chart of turbulence by altitude chart according to an exemplary embodiment of the present invention.

FIG. 12 illustrates an example of a turbulence by altitude chart according to the exemplary embodiment of the present invention.

As shown in FIG. 12, the control unit 3400 may obtain a flight information region with a flight altitude added thereto, display aviation weather information about the occurrence of turbulence by altitude on the flight information region, and obtain a turbulence by altitude chart showing an altitude change according to the flight path on the flight information region.

Figure 13:
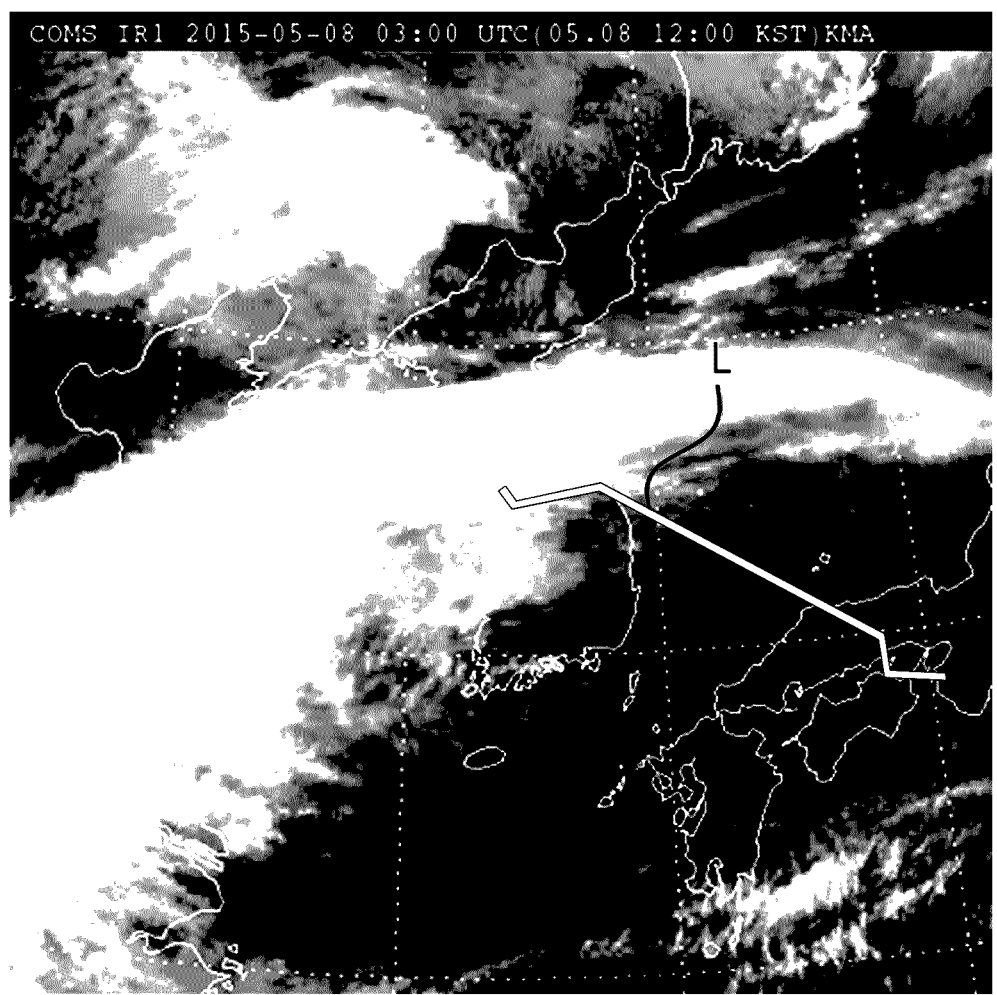
FIG. 13 illustrates an example of a satellite image chart according to an exemplary embodiment of the present invention.

FIG. 13 illustrates an example of a satellite image chart according to the exemplary embodiment of the present invention.

As shown in FIG. 13, the control unit 3400 may obtain a flight information region through which a flight passes, display aviation weather information about a phase cloud image on the flight information region, and obtain a satellite image chart showing the flight path on the flight information region.

Figure 14:
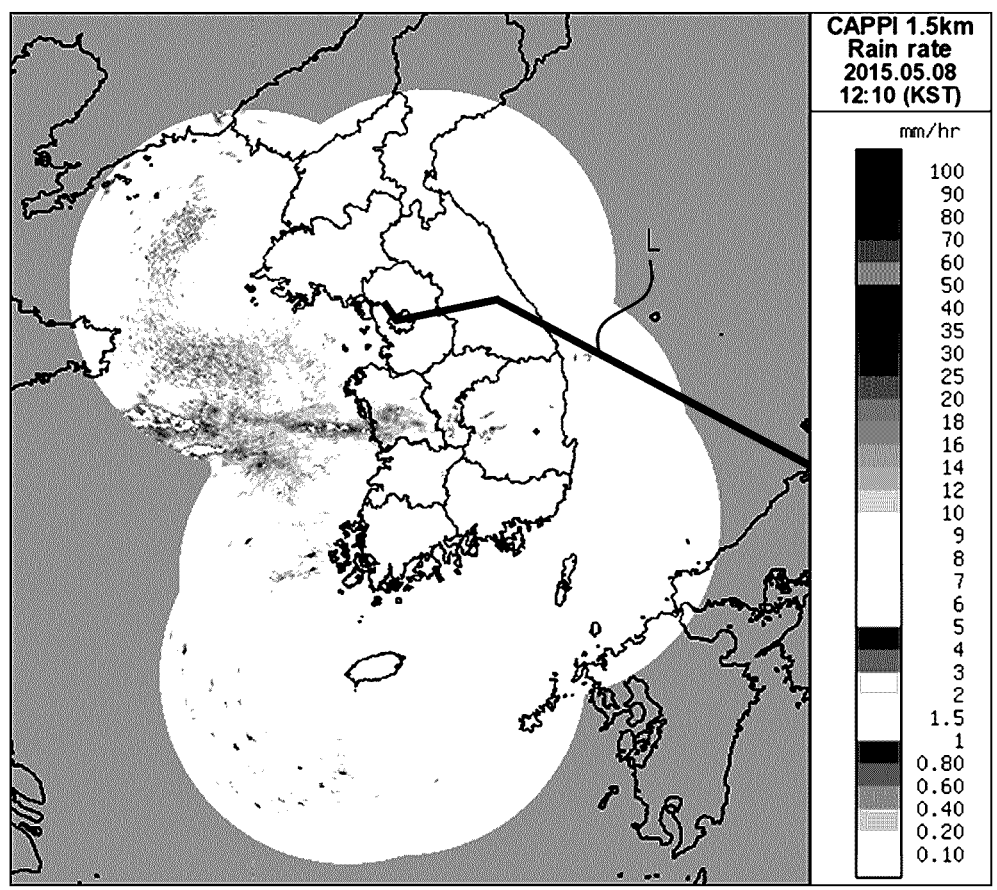
FIG. 14 illustrates an example of a radar image chart according to an exemplary embodiment of the present invention.

FIG. 14 illustrates an example of a radar image chart according to the exemplary embodiment of the present invention.

As shown in FIG. 14, the control unit 3400 may obtain a flight information region through which a flight passes, display aviation weather information about a radar image on the flight information region, and obtain a radar image chart showing the flight path on the flight information region.

The control unit 3400 may output the aviation weather chart (S500).

The control unit 3400 may control the display unit 3200 to output the aviation weather chart.

The control unit 3400 may have a user choice about the aviation weather chart inputted thereto through the separate input apparatus, and may control the display unit 3200 to output the chart selected by the user on the basis of the user input.

The control unit 3400 may transmit the aviation weather chart to the network 4000 through the communication unit 3100.

The network 4000 may transmit the aviation weather chart received from the aviation weather chart apparatus 3000 to at least one of a homepage and a mobile terminal.

The homepage and the mobile terminal may request that the network 4000 transmit the aviation weather chart, and the network 4000 may transmit the request received from the homepage and mobile terminal to the aviation weather chart apparatus 3000.

The homepage and the mobile terminal may request that the network 4000 transmit the aviation weather chart and transmit at least one of the charts included in the aviation weather chart.

The aviation weather chart apparatus 3000 may transmit the entire aviation weather chart to the network 4000 according to the request received from the network 4000, and transmit the chart corresponding to the request received from the network 4000 to the network 4000.

Meanwhile, when the flight information region is larger than a certain size, that is, when aviation weather information of a particular time band is not sufficient to fully display aviation information during a passage time when the flight passes through the flight information region (i.e., when a time required to pass is at least twice as long as the time interval in the forecast information), the flight information region may be divided into sub-flight information regions and an aviation weather chart may then be created for each of the sub-flight information regions using different aviation weather information.

For example, a flight information region through which it takes 5 hours to pass may be divided into 5 sub-flight information regions which may match pieces of aviation weather information at a first entry point and at one hour-intervals therefrom in order from an entry direction to a departure direction. In this case, it may be reasonable to determine a division number for the sub-flight information regions on the basis of the forecast period.

Alternatively, it is also possible to select weather information of the worst weather among the aviation weather information corresponding to the passage time of the flight information region as the weather information to be matched.

Alternatively, it is also possible to obtain an average value of corresponding aviation weather information during the flight passage and then map the weather chart using the average value.

While the present invention has been described with reference to the exemplary embodiments thereof, it should be understood that the present invention is not limited thereto, and a person of ordinary skill in the art to which the present invention pertains may make modifications and variations thereto, and such modifications or variations are within the scope of the appended claims.

The invention claimed is:

1. An aviation weather chart apparatus comprising:
a communication unit;
and
a control unit configured to:
receive, via the communication unit flight identification information for identifying a flight
obtain specific flight path information among a plurality of flight path information based on the flight identification information, wherein the specific flight path information includes at least one of flight route information, departure airport information, arrival airport information, departure time information at a departure airport and arrival time information at an arrival airport,
obtain area information related to specific areas through which a specific flight pass corresponding to the specific flight path information among predetermined areas,
obtain aviation weather information reflecting a weather condition of the specific areas for a plurality of time points, and
generate an aviation weather chart based on the aviation weather information, wherein the aviation weather chart includes the weather condition of the specific areas at specific time points being related to a time of the flight entry to the specific areas, and
control to output the aviation weather chart,
wherein the specific areas include first flight information region, second flight information region, and third flight information region,
wherein the specific time points include a first time point, a second time point, and a third time point,
wherein the first time point being related to a time of flight entry to the first flight information region, the second time point being related to a time of flight entry to the second flight information region, and the third time point being related to a time of flight entry to the third flight information region,
wherein the first, second, and third time points are selected among the plurality of time points based on at least one of the flight route information, the departure airport information, the departure time information, the arrival airport information, the arrival time information, and the area information corresponding to each of the first, second, and third flight information regions,
wherein a first weather condition is a weather condition of the first flight information region at the first time point, a second weather condition is a weather condition of the second flight information region at the second time point, and a third weather condition is a weather condition of the third flight information at the third time point,
wherein the aviation weather chart is provided as a single chart including the first, second, and third weather conditions; and
wherein the first time point and the second time point are the same time point, and the third time point is different from the first time point and the second time point.

2. The aviation weather chart apparatus of claim 1, wherein the aviation weather information includes at least one of BUFR information, GRJB information, METAR, SPECI, TAF, SIGMET, ARFOR, ROFOR, AIREP, and a notice to airmen (NOTAM).

3. The aviation weather chart apparatus of claim 1, wherein the flight path information includes at least one of entire flight information region information, pass flight information region information, path information, departure airport information, arrival airport information, and transit information.

4. The aviation weather chart apparatus of claim 1, wherein the aviation weather chart includes at least one of a significant weather chart, a wind and temperature chart, a turbulence chart, a wind and temperature/humidity by altitude chart, a turbulence by altitude chart, a satellite image chart, and a radar image chart.

5. The aviation weather chart apparatus of claim 1, wherein a period of the plurality of time points is three hours.

6. The aviation weather chart apparatus of claim 1,
wherein a time interval between the time of flight entry to the first flight information region and the time of flight entry to the second flight information region is shorter than the period of the plurality of time points, and
wherein a time interval between the time of flight entry to the first flight information region and the time of flight entry to the third flight information region is longer than the period of the plurality of time points.

7. The aviation weather chart apparatus of claim 1, further comprising a display unit configured to visually output the aviation weather chart.

8. The aviation weather chart apparatus of claim 1, wherein the control unit controls the communication unit to transmit the aviation weather chart to a network connected to the communication unit.

9. A method of providing an aviation weather chart, comprising:
obtaining flight identification information to identify a flight;
obtaining specific flight path information among a plurality of flight path information based on the flight identification information, wherein the specific flight path information includes at least one of flight route information, departure airport information, arrival airport information, departure time information at a departure airport and arrival time information at an arrival airport;
obtaining area information related to specific areas through which a specific flight pass corresponding to the specific flight path information among predetermined areas;
obtaining aviation weather information reflecting a weather condition of the specific areas for a plurality of time points;
generating an aviation weather chart based on the aviation weather information, wherein the aviation weather chart includes the weather condition of the specific areas at specific time points being related to a time of the flight entry to the specific areas; and
controlling to output the aviation weather chart,
wherein the specific areas include first flight information region, second flight information region, and a third time point,
wherein the first time point being related to a time of flight entry to the first flight information region, the second time point being related to a time of flight entry to the second flight information region, and the third time point being related to a time of light entry to the third flight information region, wherein the first, second, and third time points are selected among the plurality of time points based at least one of on the flight route information, the departure airport information, the departure time information, the arrival airport information, the arrival time information, and the area information corresponding to each of the first, second, and third flight information regions, wherein a first weather condition is a weather condition of the first flight information region at the first time point, and a second weather condition is a weather condition of the second flight information at the second time point, and a third weather condition is a weather condition of the third flight information at the third time point, wherein the aviation weather chart is provided as a single chart including the first, second, and third weather conditions, wherein the first time point and the second time point are the same time point, and the third time point is different from the first time point and the second time point.

10. The method of claim 9, wherein the aviation weather information includes at least one of BUFR information, GRIB information, METAR, SPECI, TAF, SIGMET, ARFOR, ROFOR, AIREP, and a notice to airmen (NOTAM).

11. The method of claim 9, wherein the flight path information includes at least one of entire flight information region information, pass flight information region information, path information, departure airport information, arrival airport information, and transit information.

12. The method of claim 9, wherein the aviation weather chart includes at least one of a significant weather chart, a wind and temperature chart, a turbulence chart, a wind and temperature/humidity by altitude chart, a turbulence by altitude chart, a satellite image chart, and a radar image chart.

13. The method of claim 9, wherein the period of the plurality of time points is three hours.

14. The method of claim 9, wherein a time interval between the time of flight entry to the first flight information region and the time of flight entry to the second flight information region is shorter than a period of the plurality of time points.

15. The method of claim 14, wherein a time interval between the time of flight entry to the first flight information region and the time of flight entry to the third flight information region is longer than the period of the plurality of time points.

16. The method of claim 9, wherein the outputting of the aviation weather chart includes visually outputting the aviation weather chart through a display unit.

17. The method of claim 9, wherein the outputting of the aviation weather chart includes transmitting the aviation weather chart to a network connected to a communication unit.

18. A non-transitory computer-readable recording medium having recorded thereon a program for executing the method of claim 9.

* * * * *